(12) United States Patent
Zakarian

(10) Patent No.: US 7,555,861 B1
(45) Date of Patent: Jul. 7, 2009

(54) APPARATUS FOR TRANSPORTING AND HOLDING OBJECTS

(76) Inventor: Artin J. Zakarian, 9903 Wonderful Day Dr., Las Vegas, NV (US) 89148

( * ) Notice: Subject to any disclaimer, the term of this patent is extended or adjusted under 35 U.S.C. 154(b) by 58 days.

(21) Appl. No.: 11/900,975

(22) Filed: Sep. 14, 2007

(51) Int. Cl.
*A01K 97/10* (2006.01)

(52) U.S. Cl. .................. 43/21.2; 248/512; 248/514; 248/511

(58) Field of Classification Search ............. 43/21.2, 43/16; 248/511–518
See application file for complete search history.

(56) References Cited

U.S. PATENT DOCUMENTS

| | | | |
|---|---|---|---|
| 1,848,235 A * | 3/1932 | Wiley | ............ 362/473 |
| 4,198,775 A * | 4/1980 | Leisner | ............ 43/21.2 |
| 4,807,384 A | 2/1989 | Roberts, Sr. | |
| 4,827,654 A | 5/1989 | Roberts | |
| 5,054,737 A | 10/1991 | DeLancey | |
| 5,054,738 A | 10/1991 | Harding | |
| 5,121,565 A | 6/1992 | Wille et al. | |
| 5,231,785 A | 8/1993 | Roberts | |
| 5,313,734 A | 5/1994 | Roberts | |
| 5,625,974 A * | 5/1997 | Demaio | ............ 43/21.2 |
| 5,915,942 A | 6/1999 | Ratliffe | |
| 6,302,367 B1 | 10/2001 | Ratza et al. | |
| 6,357,166 B1 | 3/2002 | Malmanger et al. | |
| 6,401,381 B1 | 6/2002 | Broberg | |
| 6,571,507 B2 | 6/2003 | Elford | |
| 6,626,409 B1 * | 9/2003 | Thompson | ............ 248/539 |
| 6,962,018 B1 | 11/2005 | King | |
| 7,051,471 B1 * | 5/2006 | Ausborne, Jr. | ............ 43/54.1 |
| 2002/0166281 A1 | 11/2002 | Broberg | |
| 2005/0235548 A1 | 10/2005 | Barron et al. | |
| 2006/0254118 A1 * | 11/2006 | Warecke | ............ 43/21.2 |
| 2006/0265934 A1 | 11/2006 | Morris | |
| 2007/0017142 A1 | 1/2007 | Jaworski | |
| 2007/0039230 A1 * | 2/2007 | Burnley | ............ 43/21.2 |
| 2007/0044367 A1 * | 3/2007 | Slatter | ............ 43/21.2 |

* cited by examiner

*Primary Examiner*—Amy J. Sterling

(57) ABSTRACT

A portable apparatus for transporting objects, non-limiting examples of which may include elongated bars such as garden tools or fishing rods, and for holding of objects including elongated rods and or beverage containers such as bottles or cups within the same unit. In addition, the present invention provides a portable apparatus that detachably mounts and removably secures onto a permanent structure at any orientation using a novel universal mount joint, and includes a handle for transporting objects.

11 Claims, 20 Drawing Sheets

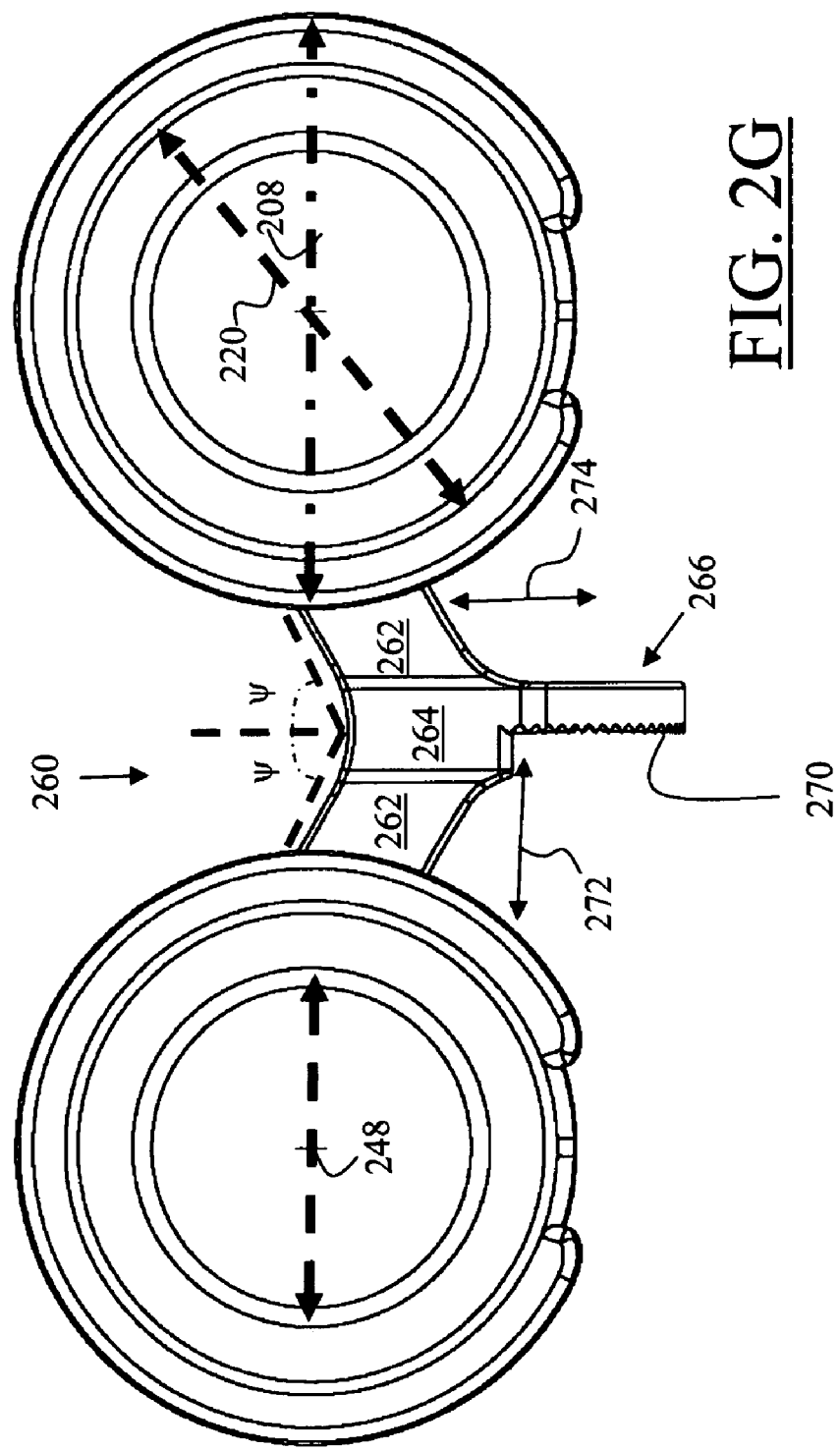

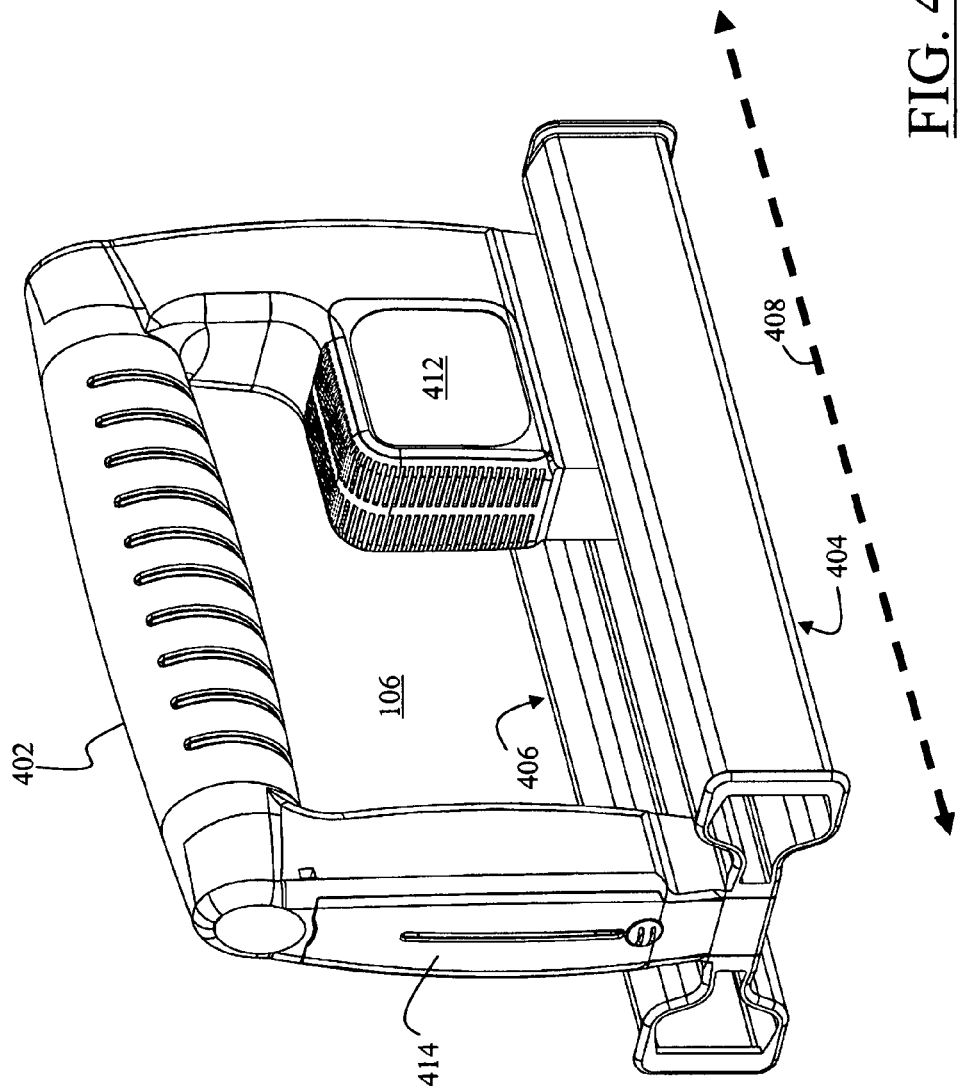

APPARATUS FOR TRANSPORTING AND HOLDING OBJECTS

BACKGROUND OF THE INVENTION (1) Field of the Invention

This invention is related to a portable apparatus for transporting objects, non-limiting examples of which may include elongated bars or fishing poles, and for holding objects including beverage containers such as bottles, cups, or cans.

(2) Description of Related Art

Conventional rod holders and beverage container holders are well known and have been in use for a number of years. Reference is made to the following few exemplary U.S. Patent Publications, including U.S. Pat. Nos. 5,054,738; 5,121,565; 6,302,367; 4,807,384; 6,571,507; 5,054,737; 5,231,785; 5,313,734; 5,915,942; 6,357,166; 6,962,018; 6,401,381; and U.S. Patent Application Publications 2006/0265934; 2005/0235548; 2007/0017142; and 2002/0166281. Regrettably, most prior art fishing rod holders and drink container holders suffer from obvious disadvantages in that they have dedicated units for respectively holding either fishing rods or beverages (but not both within the same unit holder). In other words, the prior art holders are either designed to retain a beverage or a fishing pole, but not both. Further, most prior art holders lack the means for transporting elongated objects, must permanently attach to a structure, and are bulky in size.

Accordingly, in light of the current state of the art and the drawbacks to current rod and drink holders mentioned above, a need exists for an apparatus for transporting objects, non-limiting examples of which may include elongated bars such as fishing poles, and for storage of objects including fishing poles and or beverage containers such as bottles or cups within the same unit. In addition, a need exists for such an apparatus that would detachably mount and removably secure onto a permanent structures at any orientation using a novel universal mount joint.

BRIEF SUMMARY OF THE INVENTION

One aspect of the present invention provides a portable apparatus for transporting and holding objects, comprising a holder to retain containers and items, including transporting of items with elongated configurations. The holder is comprised of a single piece, integrally molded, substantially cylindrical configuration, including a first section that is comprised of a first opening transverse an axial length of the holder, and having a first cross-sectional length. The first section also includes a first lip that includes a first rim that defines a first perimeter of the first opening, with the first lip tilted and diverged away from a first center of the first opening at an angle for facilitating insertion and removal of containers and items of elongated configuration. Further constituting the first section is a first body having substantially cylindrical hollow configuration with a first height and a second-cross-sectional length smaller than the first cross-sectional length. The first body includes a substantially "U" shaped second opening with a length oriented longitudinally parallel along an axial length of the holder, with the second opening having length less than the first height for securing items having protrusions that are longer and extend outside the second cross-sectional length. The second opening includes a second rim that defines a second perimeter for the second opening, with the second rim and the first rim defining a continuous first upper edge opening of the first section. The first section also includes a set of narrow slits oriented longitudinally parallel along an axial length of the holder for securing the items with elongated configurations therein the holder by use of a strap inserted through the narrow slits and wrapped around the items. The first section includes a first bottom section having a third opening transverse the axial length of the holder and parallel the first opening, and having a third cross-sectional length smaller than that of the second cross-sectional length. The holder also includes a second section that is comprised of a second body having substantially cylindrical configuration that is hollow with a second height, including the third opening at proximal end and a fourth opening at a distal end, with second body and the fourth opening having the third-cross-sectional length. The second section also includes one or more holes at the distal end of the second body for storage of accessories that are inserted within the one or more holes. The portable apparatus further includes a universal joint mount coupled with the holder to detachably secure the holder adjustably onto a structure, and a handle detachably coupled with the holder for transporting the holder.

An optional aspect of the present invention provides a portable apparatus for transporting and holding objects, wherein the second-cross-sectional length is approximately 2 inches to about 4 inches and the third-cross-sectional length is approximately 1 to 3 inches.

Another optional aspect of the present invention provides a portable apparatus for transporting and holding objects, wherein the holder is comprised of a plurality of holders that are coupled with one another by a bridge connector as a single piece, integral unit with each holder of the plurality of holders having a substantially cylindrical configuration.

Yet another optional aspect of the present invention provides a portable apparatus for transporting and holding objects, wherein a first holder and a second holder of the plurality of holders are comprised of a single piece, substantially cylindrical configuration, with the first and second holders having varying cross-sectional lengths.

Further optional aspect of the present invention provides a portable apparatus for transporting and holding objects, wherein the holder is configured for storage of a beverage container and an elongated item.

Still a further optional aspect of the present invention provides a portable apparatus for transporting and holding objects, wherein the holder is further comprised of a connector mechanism that mates with the universal joint mount through an adjustable intermediary coupler.

Another optional aspect of the present invention provides a portable apparatus for transporting and holding objects, wherein the holder, the bridge connector, and the connector mechanism are integrally molded, forming a single piece unit.

A further optional aspect of the present invention provides a portable apparatus for transporting and holding objects, wherein a first end of the intermediary coupler is connected with the connector mechanism, and a second end of the intermediary coupler is inserted within a mounting aperture of the universal joint mount, and detachably secured therein by a second fastener, which allows the holder to rotate in any direction and thus be positioned at any orientation.

Still a further optional aspect of the present invention provides a portable apparatus for transporting and holding objects, wherein the universal joint mount is comprised of a stationary jaw and an adjustable jaw for clamping to a structure, with the adjustable jaw moving towards the stationary jaw by a third fastener for varying a clamping tension.

Another optional aspect of the present invention provides a portable apparatus for transporting and holding objects, wherein the handle is comprised of a hand grip section, and a first and second elongated mounting bases oriented longitudinally along an axial length of the handle, with the holder detachably clamped with one of a first and second elongated mounting bases by the universal joint mount for transporting objects.

Yet another optional aspect of the present invention provides a portable apparatus for transporting and holding objects, wherein the handle includes a built-in tape measure, a thermometer, and a weight scale.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout:

FIG. 2G is an exemplary lateral (along the width) illustration of a holder in accordance with the present invention;

FIG. 4A is an exemplary rear-perspective illustration of a handle used with the portable apparatus of the present invention for transporting items;

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

The present invention provides a portable apparatus for transporting objects, non-limiting examples of which may include elongated rods such as garden tools or fishing poles, and for securely holding objects including fishing rods and or beverage containers such as glasses, bottles, cups or cans within the same unit. In addition, the present invention provides a portable apparatus that detachably mounts and removably clamps onto a permanent structures at any orientation using a novel universal mount joint.

Figure 1A:
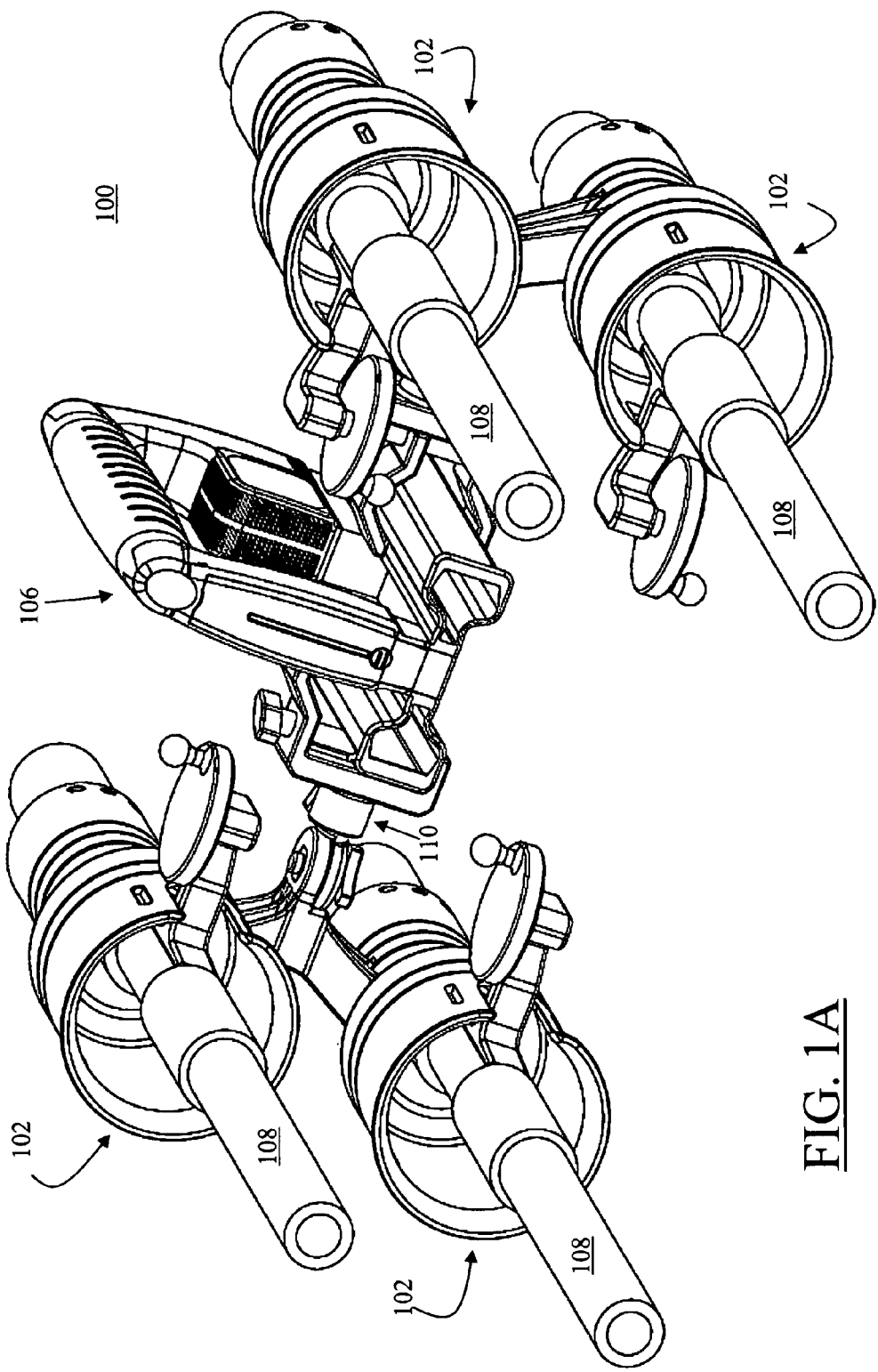
FIG. 1A is an exemplary front perspective illustration of a portable apparatus for transporting and holding objects in accordance with the present invention.
Figure 1B:
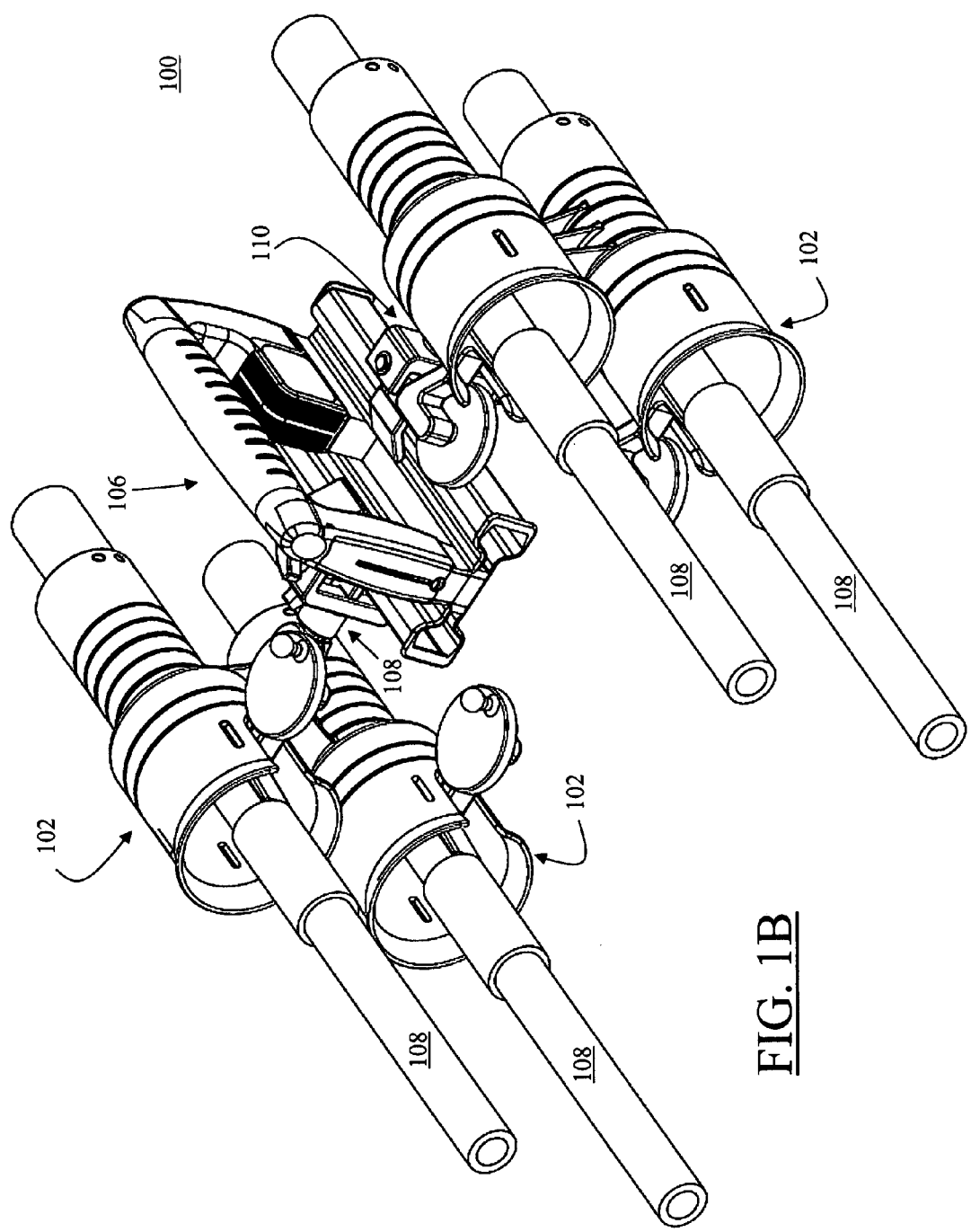
FIG. 1B is an exemplary top perspective illustration of the portable apparatus of FIG. 1A.
Figure 1C:
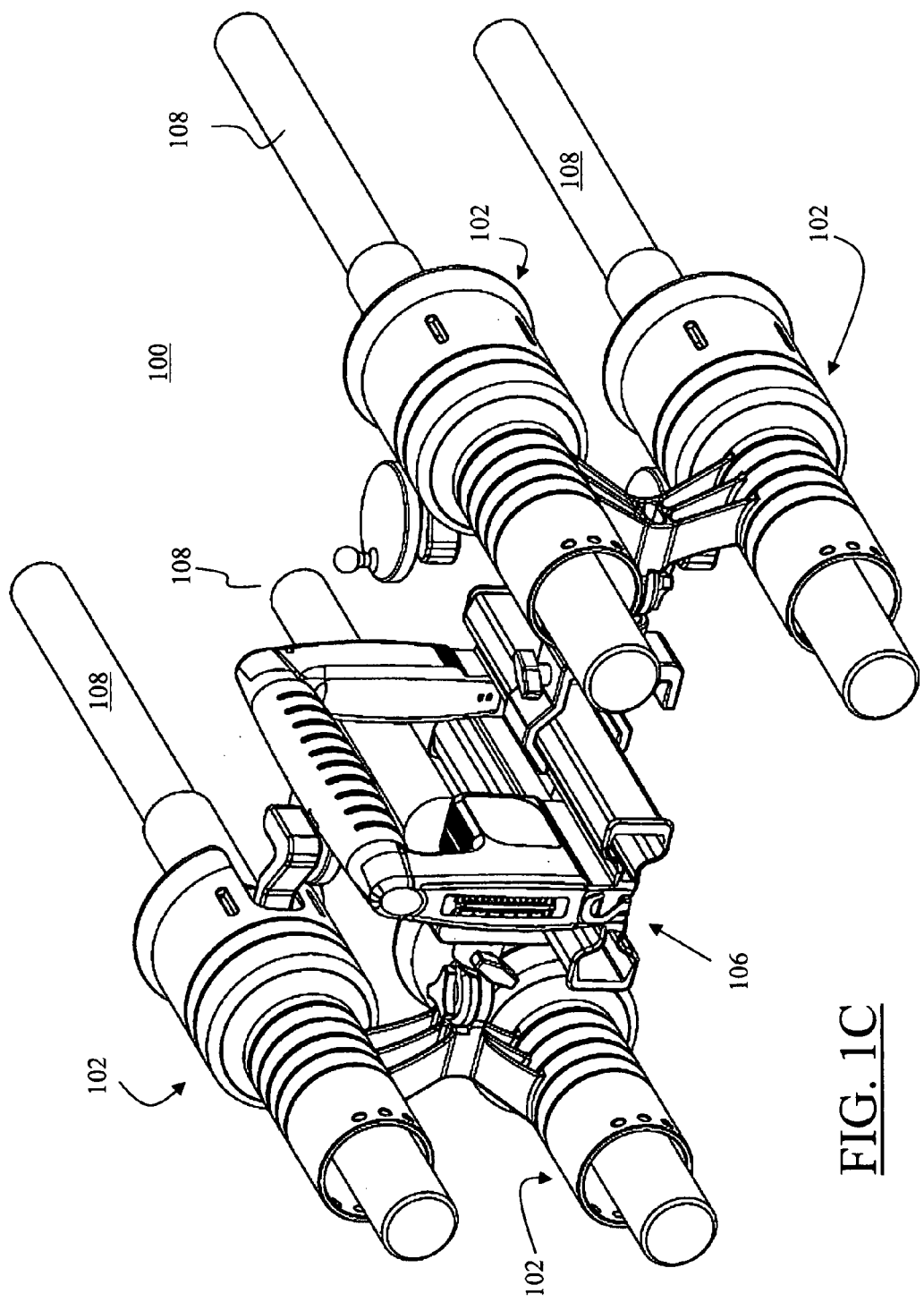
FIG. 1C is an exemplary rear perspective illustration of the portable apparatus of FIG. 1A.
Figure 1D:
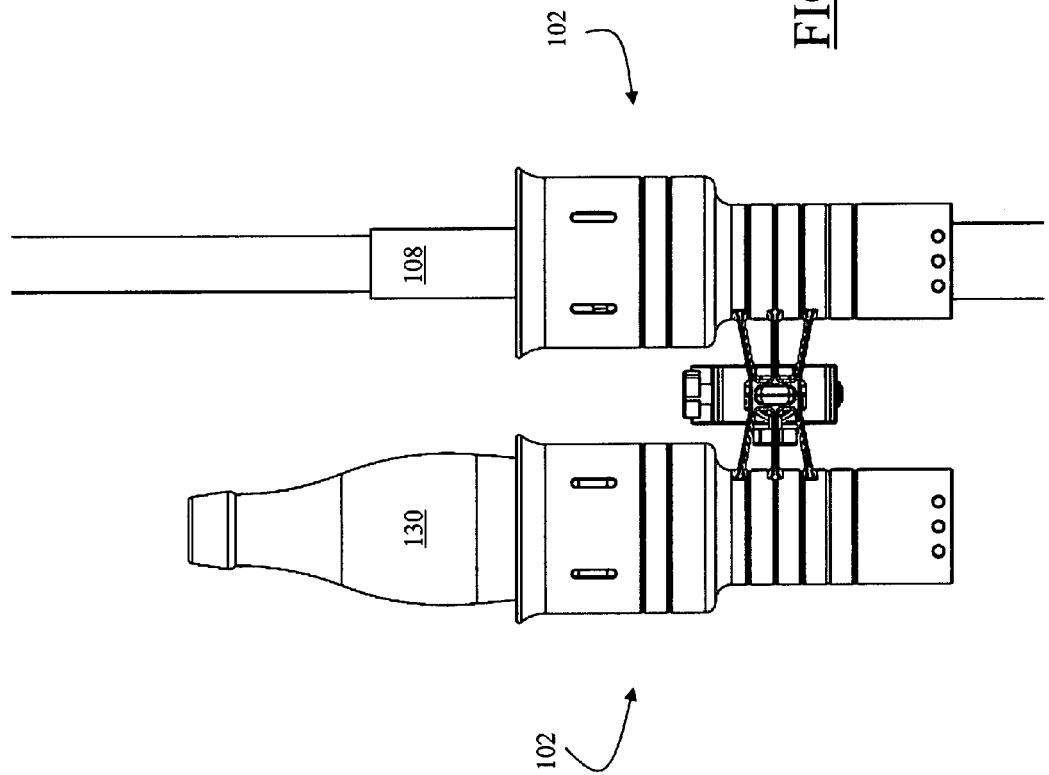
FIG. 1D is an exemplary plan view of the portable apparatus of FIG. 1A.
Figure 3A:
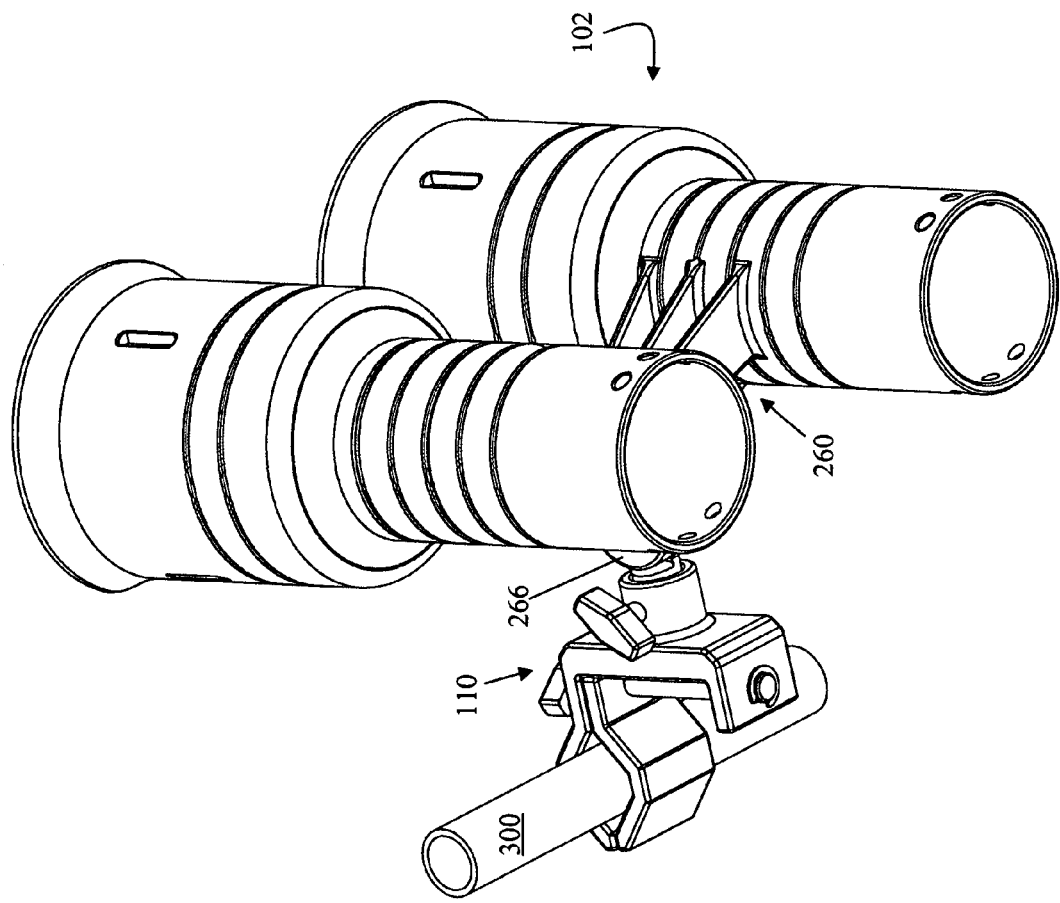
FIG. 3A is an exemplary perspective illustration of the portable apparatus coupled with a fixed structure by a universal joint mount.

FIG. 1A is an exemplary front perspective illustration of a portable apparatus for transporting and holding objects in accordance with the present invention, and FIG. 1B is an exemplary top perspective illustration of the portable apparatus of FIG. 1A, FIG. 1C is an exemplary rear perspective illustration of the portable apparatus of FIG. 1A, and FIG. 1D is an exemplary plan view of the portable apparatus of FIG. 1A. As illustrated in FIGS. 1A to 1D, the portable apparatus 100 for transporting and holding objects may be comprised of one or more holders 102 to retain and transport items, including items that have a generally elongated configuration. In this exemplary instance, the items are illustrated as one or more fishing rods 108 or beverage containers 130 (FIG. 1D). As further illustrated in FIGS. 1A to 1C, the one or more holders 102 are detachably coupled with a handle 106 by one or more set of universal joint mounts 110, which further allow the one or more holders to adjustably couple onto a structure 300 (FIG. 3A).

Figure 2A:
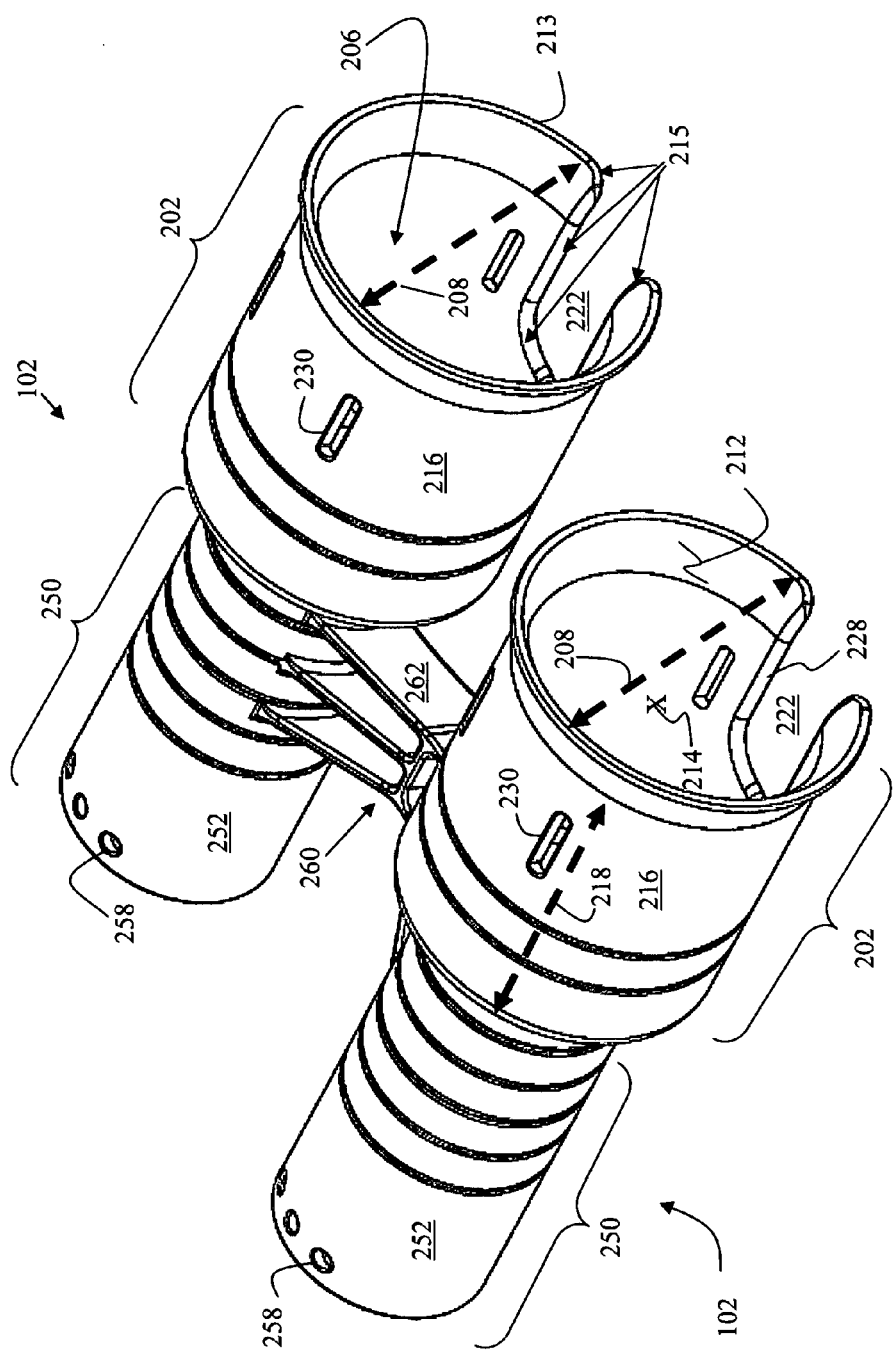
FIG. 2A is an exemplary top-front perspective illustration of a holder in accordance with the present invention.
Figure 2B:
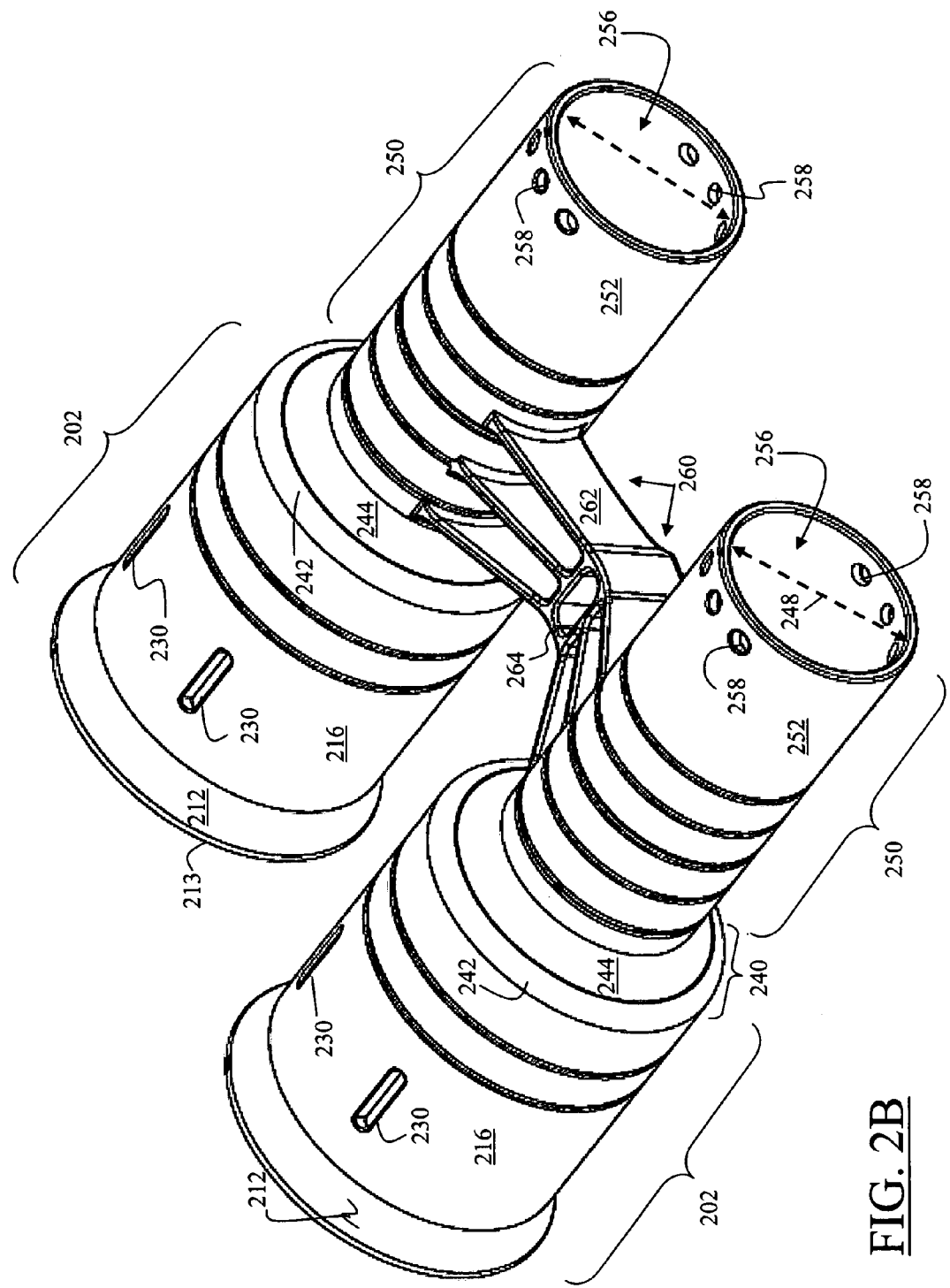
FIG. 2B is an exemplary top-rear perspective illustration of the holder illustrated in FIG. 2A.
Figure 2C:
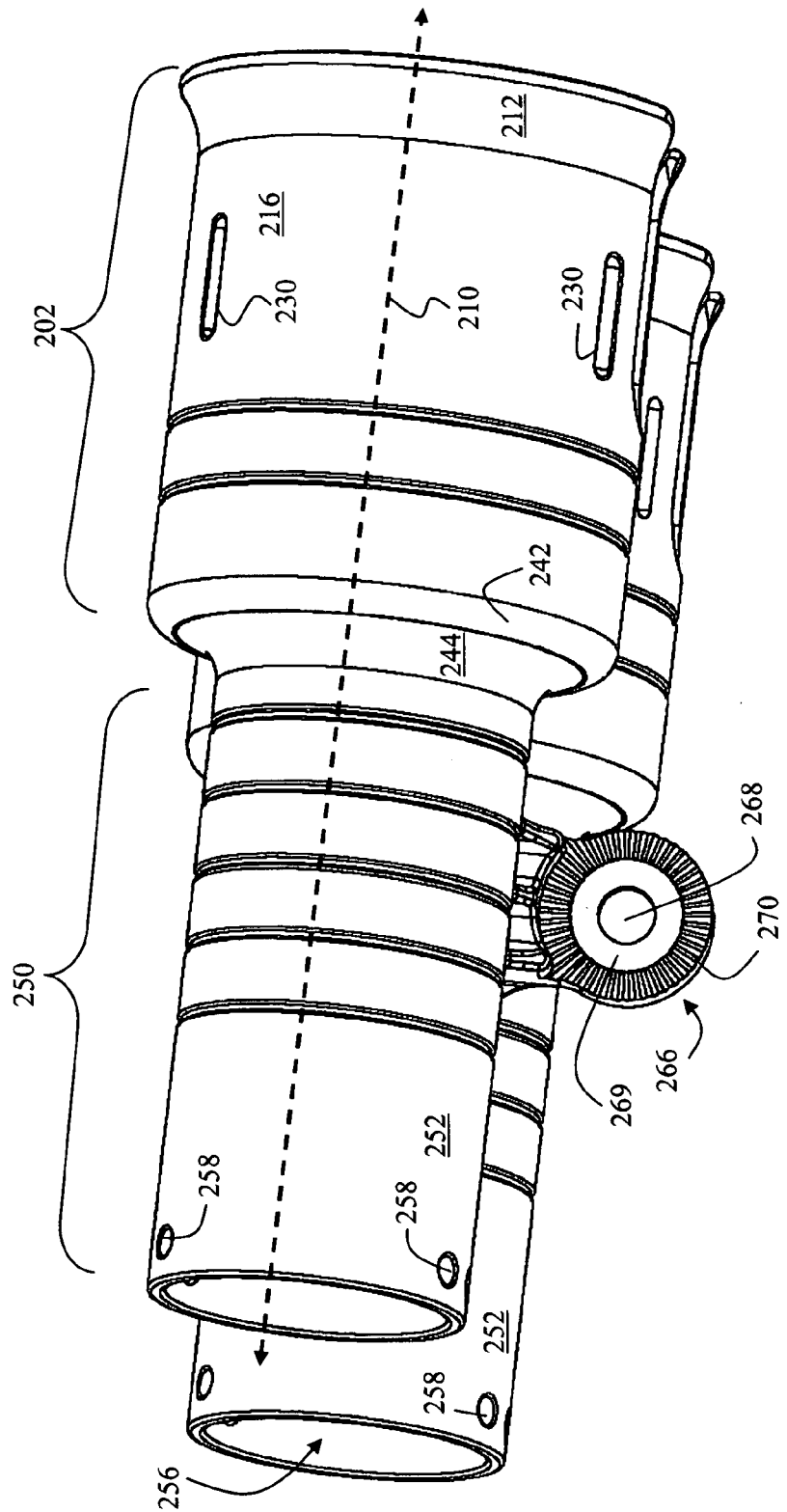
FIG. 2C is an exemplary side-perspective illustration of the holder illustrated in FIG. 2A.
Figure 2D:
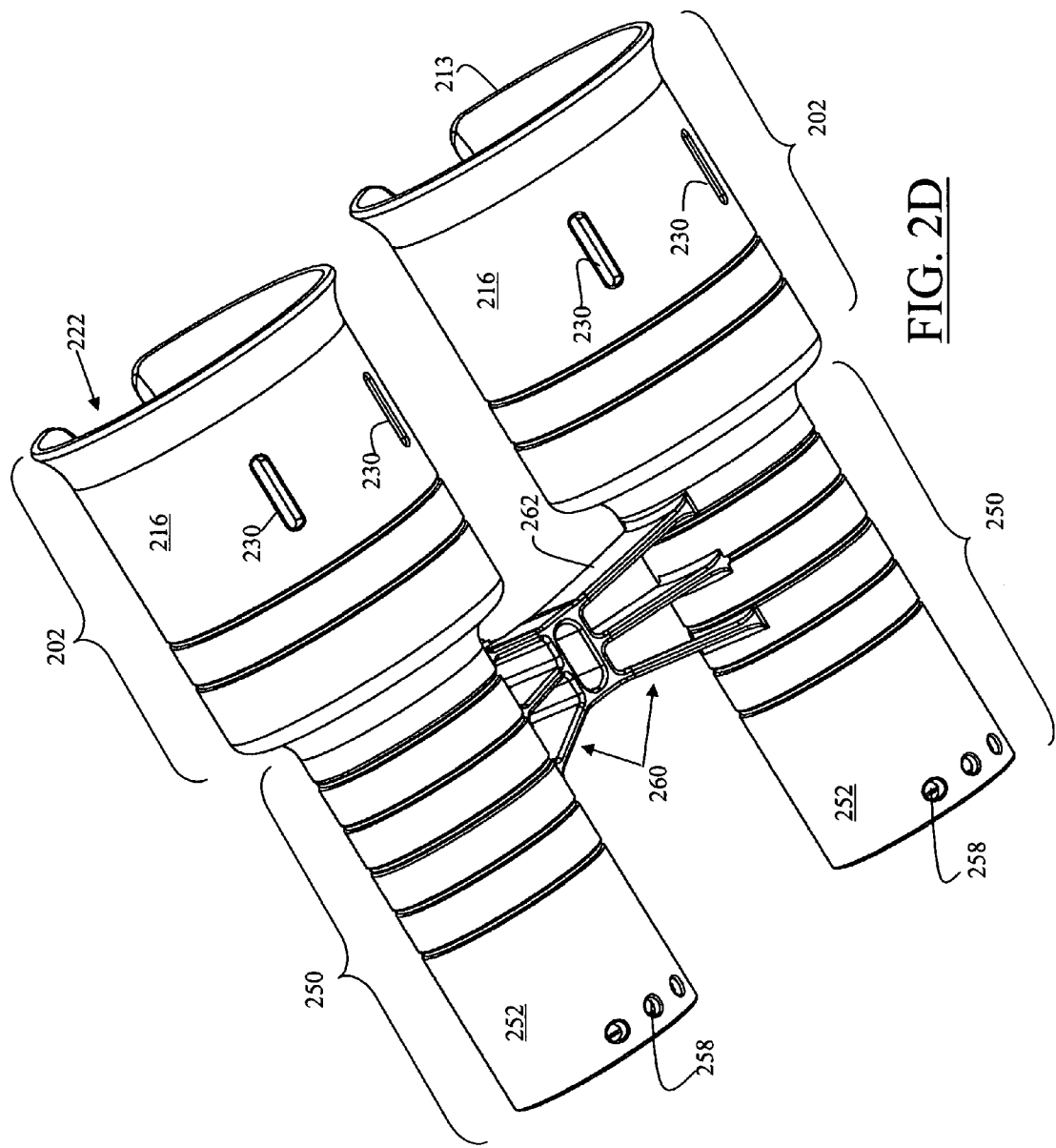
FIG. 2D is an exemplary top perspective illustration of the holder detailing the bridge connector in accordance with the present invention.
Figure 2E:
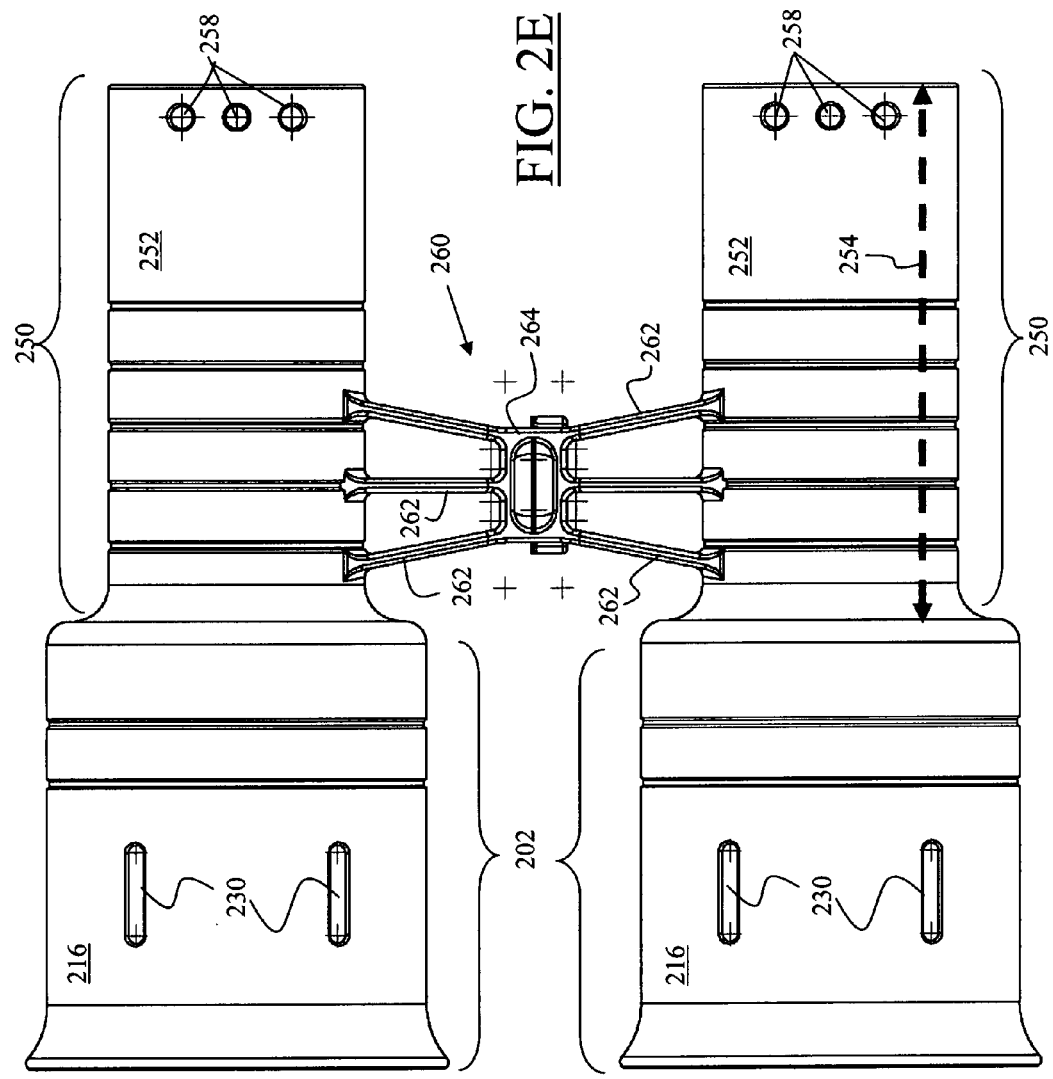
FIG. 2E is an exemplary top-plan illustration of the holder illustrated in FIG. 2A.
Figure 2F:
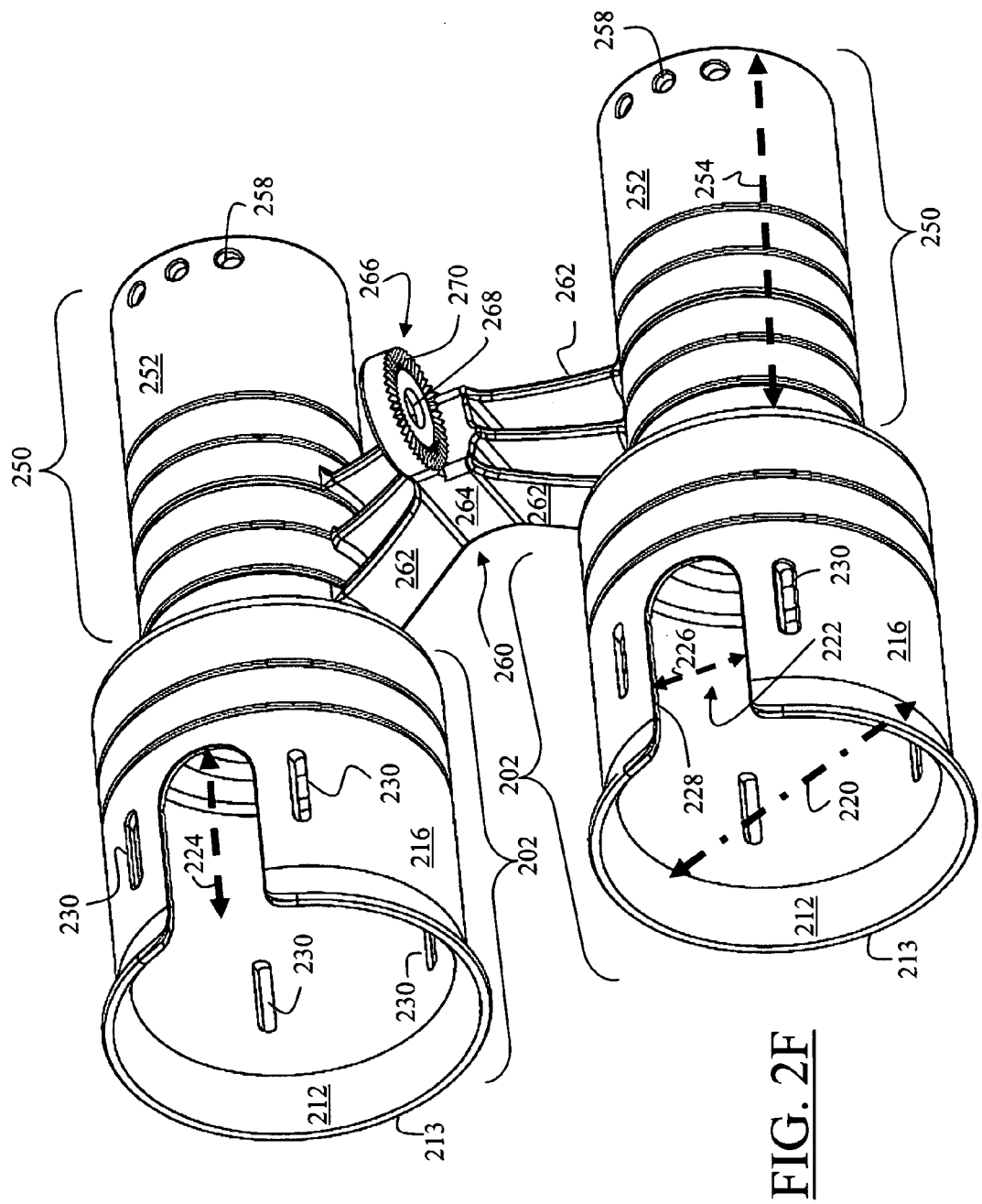
FIG. 2F is an exemplary bottom perspective illustration of a holder in accordance with the present invention.
Figure 2H:
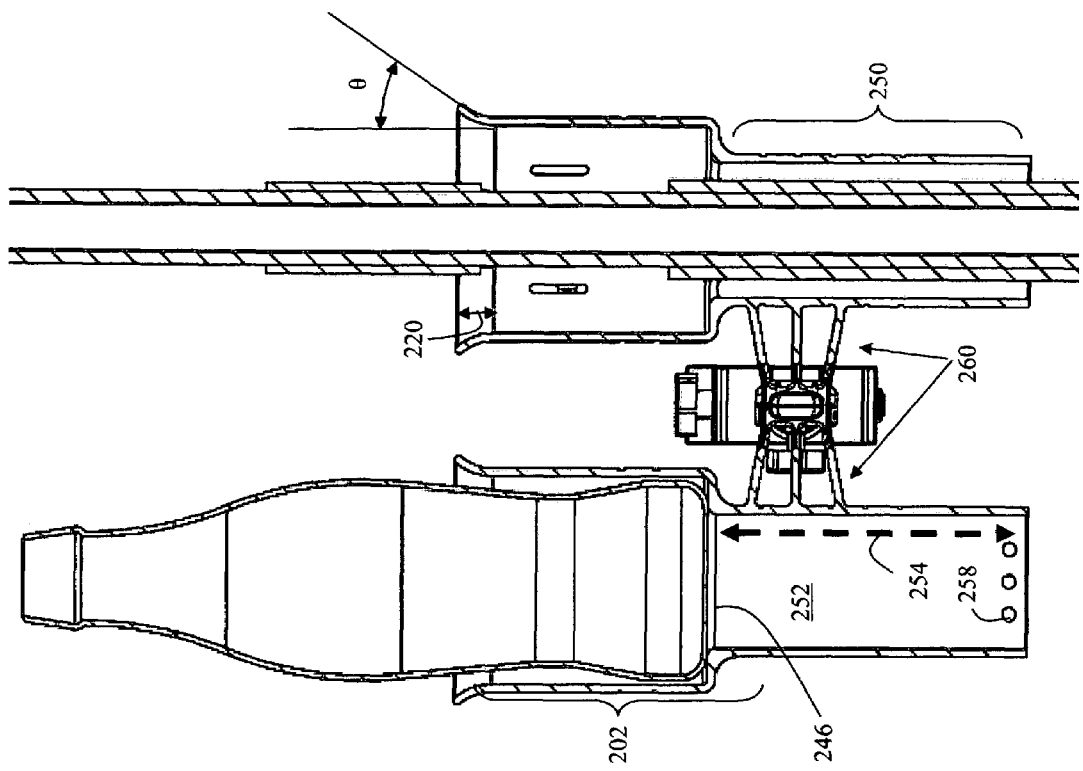
FIG. 2H is an exemplary cross sectional view along the axial length of a holder in accordance with the present invention.

FIGS. 2A to 2H are various exemplary views of a holder in accordance with the present invention. FIG. 2A is an exemplary top-front perspective illustration of a holder in accordance with the present invention, and FIG. 2B is an exemplary top-rear perspective illustration of the holder illustrated in FIG. 2A. FIG. 2C is an exemplary side-perspective illustration of the holder illustrated in FIG. 2A, and FIG. 2D is an exemplary top perspective illustration of the holder detailing the bridge connector in accordance with the present invention. FIG. 2E is an exemplary top-plan illustration of the holder illustrated in FIG. 2A, FIG. 2F is an exemplary bottom-rear perspective illustration of a holder in accordance with the present invention, and FIG. 2G is an exemplary lateral (along the width) illustration of a holder in accordance with the present invention.

As illustrated in FIGS. 2A to 2H, the portable apparatus 100 for transporting and holding objects is comprised of a holder 102 to retain containers and items, and to transport items, including items with elongated configurations. The holder is comprised of a single piece, integrally molded of substantially cylindrical configuration, and it includes a first section 202 that is comprised of a first opening 206 transverse an axial length 210 of the holder 102, with the first opening 206 having a first cross-sectional length 208. The first section 202 of the holder 102 is further comprised of a first lip 212 with height, with the first lip 212 having a first rim 213 defining a first perimeter of the first opening 206. The first rim 212 is gradually slanted and diverged away from a first center 214 of the first opening 206 at an angle θ (similar to a funnel) for easy insertion and removal of containers and other items, including fishing poles.

As further illustrated in FIGS. 2A to 2H, the first section 202 is further comprised of a first body 216 having substantially cylindrical hollow configuration with a first height 218 and a second-cross-sectional length 220 of approximately 2 to 4 inches (preferably 3 inches), but smaller than the first cross-sectional length 208. The first body 206 including a substantially "U" shaped second opening 222 with a length 224 oriented longitudinally parallel along the axial length 210 of the holder 102, with the second opening 222 having length 224 less than the first height 218 for securing items having protrusions that are longer and extend outside the second cross-sectional length 220. The second opening 222 has sufficiently wide width 226 to enable the reel of a fishing pole or a handle of a coffee cup or other items having protrusions that are longer than that of the second cross-sectional length 220 to extend out and be held within the hollow cylindrical first body 206. Further, the second opening 222 is also used for to prevent the item from rotating from its originally inserted orientation. The second opening 222 further includes a second rim 228 that defines a second perimeter for the second opening 222, with the second rim 228 and the first rim 213 defining a continuous first upper edge opening 215 of the first section 202.

As further illustrated in FIGS. 2A to 2H, the first section 202 of the holder 102 further includes a set of narrow slits 230 oriented longitudinally parallel along the axial length 210 of the holder 102 for securing items such as fishing poles therein the holder 102 by use of a strap inserted through the slits 230 and wrapped around the exemplary fishing pole. Non-limiting example of a strap may include rubber straps, belts, VELCRO®, and others. The first section 202 of the holder 102 further includes a first bottom section 240 that includes a beveled or sloped portion 242 (only from outside) and flat section 244, with the flat section 244 including a third opening 246 transverse the axial length 210 of the holder 102, and having a third cross-sectional length 248 smaller than that of the second cross-sectional length 220. The third cross-sectional length 248 is approximately 1 to 3 inches, but preferably 2 inches. It should be noted that the section 242 internally is at approximately 90° to facilitate securing a drink or a beverage container in an upright position.

As further illustrated in FIGS. 2A to 2H, the holder 102 further includes a second section 250 that is comprised of a second body 252 having substantially cylindrical configuration that is hollow with a second height 254, including the third opening 246 at one end and a fourth opening 256 at an opposite end, with second body 250 and the fourth opening 256 having the third-cross-sectional length 248 of approximately 1 to 3 inches. The second section 250 of the holder 102 further includes one or more holes 258 at an end of the second body 252 for storage of accessories that are inserted within the one or more holes 258. Non-limiting examples of accessories that may be stored therein the holes 258 may include fishing hooks, key chains, carabineers and so on.

As illustrated in FIGS. 2A to 2H, one or more holders 102 may be coupled with one another by a bridge connector 260, forming a single piece, integral unit that includes the one or more holders 102 and the bridge connector 206. As illustrated in FIGS. 2B, 2D, 2E, and 2F, the bridge connector 260 is comprised of one or more extensions 262 that are coupled with a centerpiece 264 at a first end, and fan-out in a V-shape format and are coupled with the second body 252 of the second section 250 of the holder 102 at their second ends to provide added strength and horizontal clearance 272 between the holders and the universal joint mount 110. In particular, each one of the one or more extensions 262 is coupled at a substantially middle portion of two holders 102 by their second ends to provide appropriate balance with respect to the weight of objects for when transporting them. As illustrated in FIGS. 2B, 2F, and 2G, each of the one or more extensions 262 are configured in a syncline or a "V" pattern, allowing the one or more coupled holders 102 to have clearance from connector mechanism 266, which facilitates the mounting of the one or more holders 102 onto a universal joint mount 110. The one or more extensions 262 are coupled at an incline with their second ends raised at a higher level than the first ends thereof, allowing the one or more extensions 262 to slope angle ψ from the holders 102 to the centerpiece 264. This provides a vertical clearance space 274 between the holders 102 and the universal joint mount 110. It should be noted that the centerpiece 264 forms the vertex of the "V" configuration of the bridge connector 260, which is generally the strongest portion of most "V" shaped entities. Accordingly, the one or more holders 102 have sufficient strength and support to transport objects and be coupled to structures via the bridge connector 260 coupled with a universal join mount 302.

As best illustrated in FIGS. 2C, 2F, and 2G, the bridge connector 260 is further comprised of a connector mechanism 266 that that mates with a universal joint mount 110 through an adjustable intermediary coupler 304 (FIG. 3A). The connector mechanism 266 is comprised of a concentric sections, including a central aperture 268 followed by a concentric flat section 269 surrounding the central aperture 268, followed by a radial array of beveled teeth 270 that spread out from the flat section 269. The radial array of beveled teeth 270 allow the connector mechanism 266 securely and adjustably lock with the adjustable intermediary coupler 304, while allowing for the holders 102 to rotate along a reciprocating path indicated by the arrow 373.

Figure 3B:
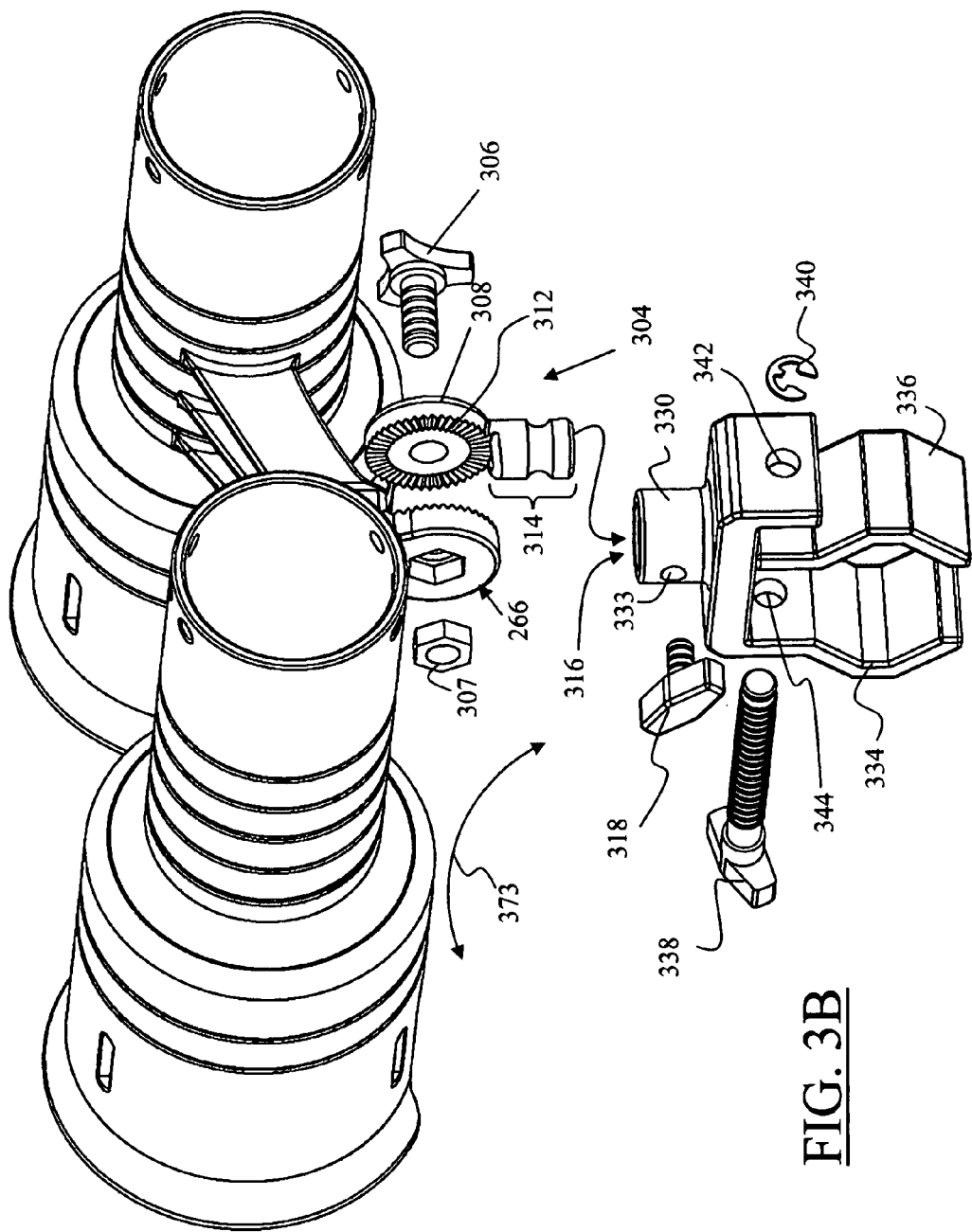
FIG. 3B is an exemplary disassembled left-rear-view perspective illustration of the universal joint mount for the portable apparatus of FIG. 3A.
Figure 3C:
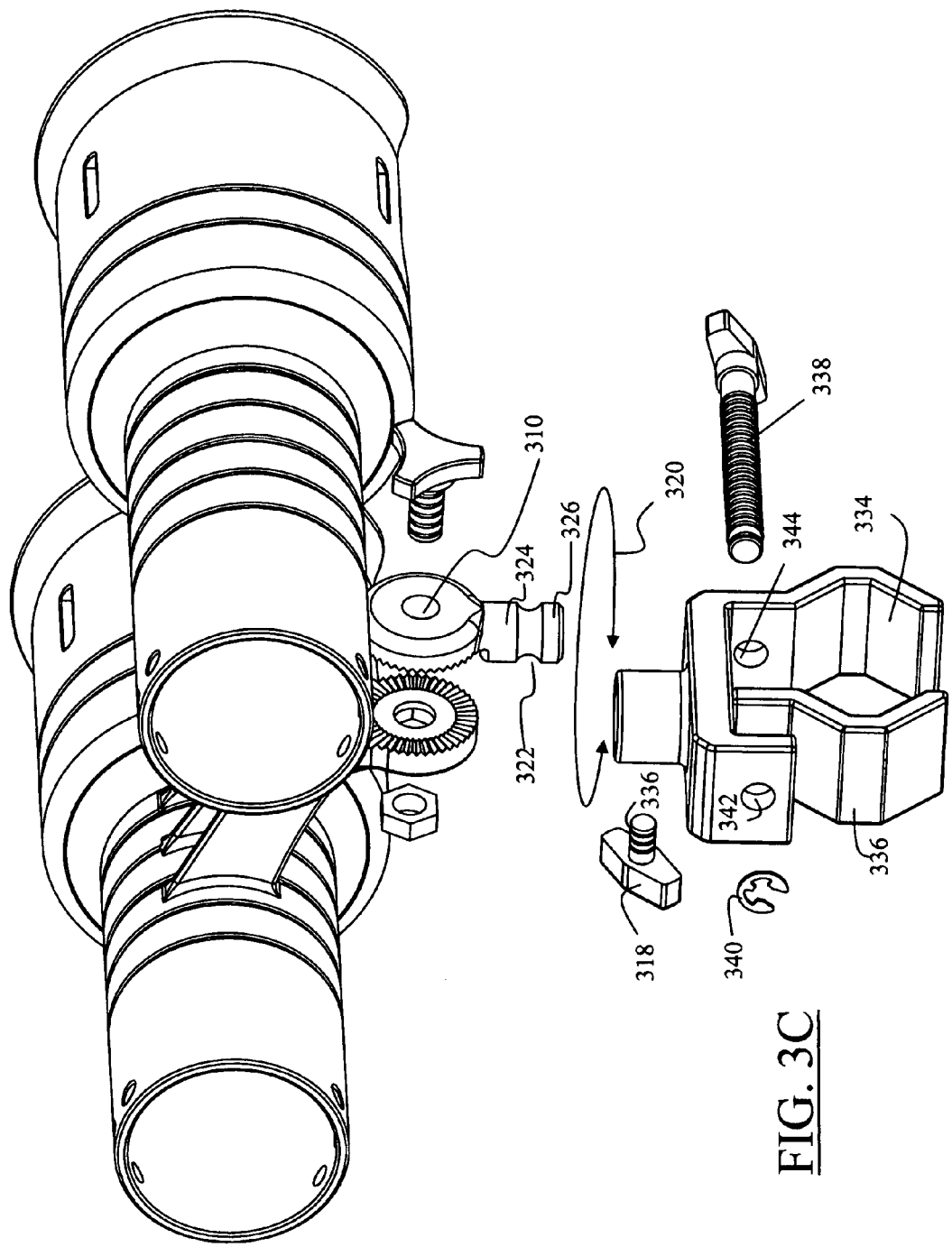
FIG. 3C is an exemplary disassembled right-rear-view perspective illustration of the universal joint mount for the portable apparatus of FIG. 3A.
Figure 3D:
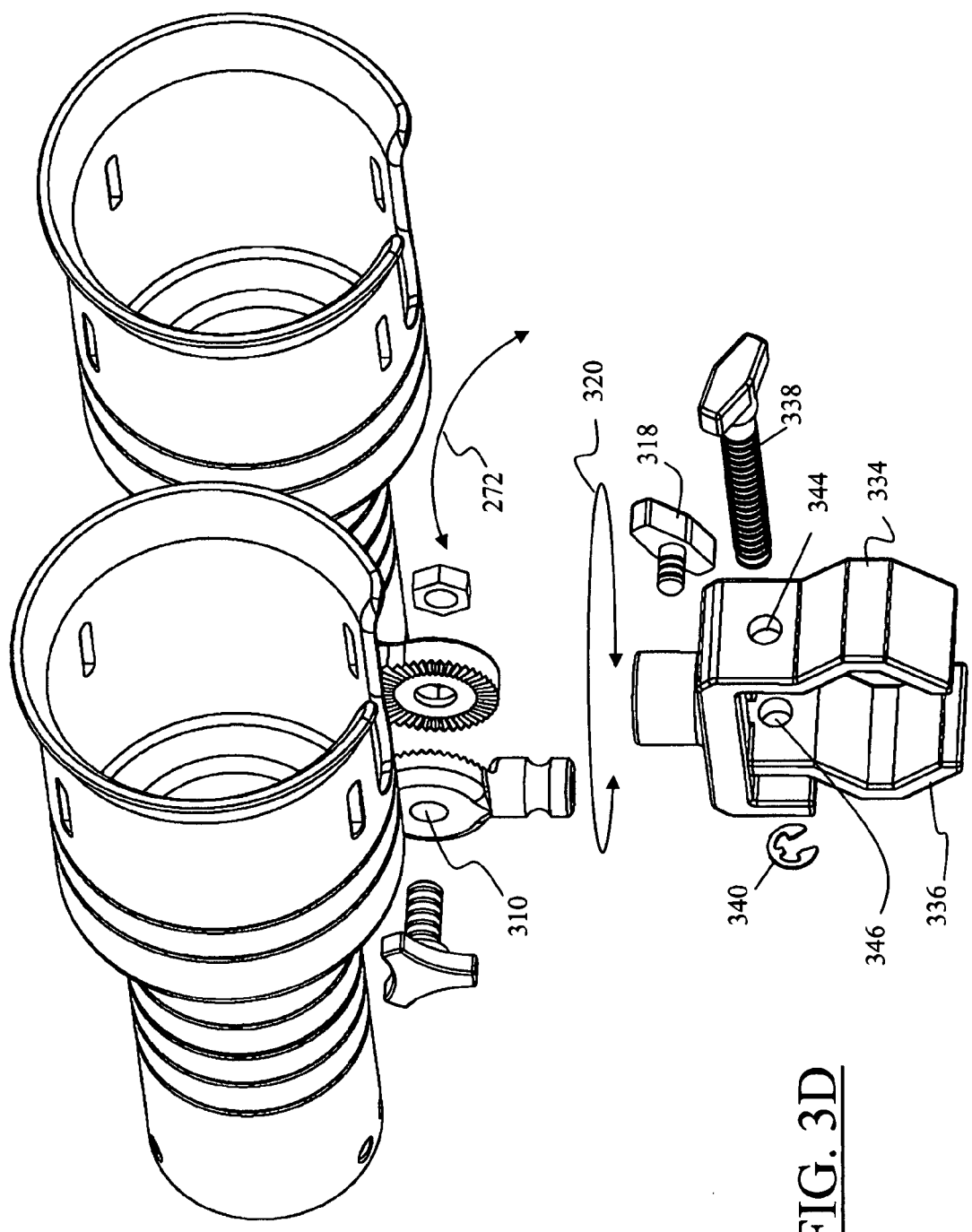
FIG. 3D is an exemplary disassembled frontal-view perspective illustration of the universal joint mount for the portable apparatus of FIG. 3A.
Figure 3E:
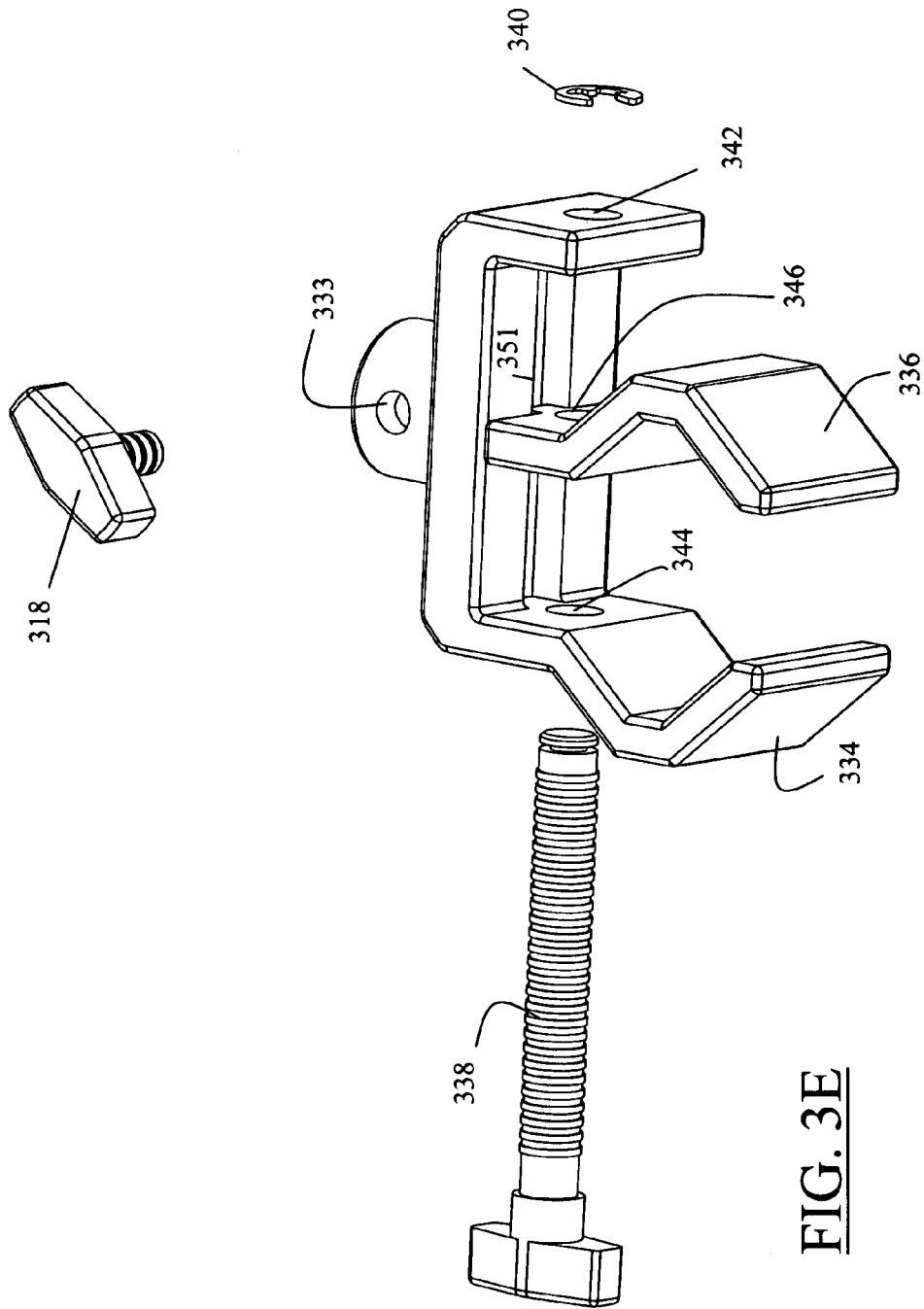
FIG. 3E is an exemplary disassembled bottom-view perspective illustration of the universal joint mount for the portable apparatus of FIG. 3A.

FIGS. 3A to 3E are various exemplary views of the holders coupled with a universal joint mount in accordance with the present invention. FIG. 3A is an exemplary perspective illustration of the portable apparatus coupled with a fixed structures by a universal joint mount. FIG. 3B is an exemplary disassembled left-rear-view perspective illustration of the universal mount for the portable apparatus of FIG. 3A, and FIG. 3C is an exemplary disassembled right-rear-view perspective illustration of the universal joint mount for the portable apparatus of FIG. 3A. FIG. 3D is an exemplary disassembled frontal-view perspective illustration of the universal joint mount for the portable apparatus of FIG. 3A. FIG. 3E is an exemplary disassembled bottom-view perspective illustration of the universal joint mount for the portable apparatus of FIG. 3A;

As illustrated in FIGS. 3A to 3E, the universal joint mount 110 is coupled with the holders 102 by the connector mechanism 266 of the bridge connector 260, which detachably secure the holders 102 adjustably onto a structure 300. As best illustrated in FIGS. 1A to 1C, the universal joint mount 110 further detachably couples with a handle 106 for transporting the holders 102 with objects secured therein. As illustrated in FIGS. 3A to 3E, the connector mechanism 266 mates with the universal joint mount 110 through an adjustable intermediary coupler 304 by a threaded fastener 306. The one or more holders 102, the bridge connector 260, and the connector mechanism 266 are integrally molded and coupled, forming a single piece unit which creates a strong, yet adjustable apparatus.

The intermediary coupler 304 is comprised of a first end 308 that is connected with the connector mechanism 266 by the first fastener 306. The first fastener is inserted through the aligned apertures 310 of the intermediary coupler 304 and aperture 268 of the connector mechanism 266, and secured by device 307, a non-limiting example of which is a nut. The first end 308 of the intermediary coupled 304 is the mirror image of the connector mechanism 266 in that the first end 308 is comprised of a concentric sections, including a central aperture 310 followed by a concentric flat section surrounding the central aperture 310, followed by radial array of beveled teeth 312 that spread out from the flat section. The radial array of beveled teeth 312 mesh and interlock with the radial array of beveled teeth 270 of the connector mechanism 266, which securely and adjustably lock the adjustable intermediary coupler 304 with the connector mechanism 266, while allowing for the holders 102 to rotate along a reciprocating path indicated by the arrow 272.

The intermediary coupler 304 is further comprised of a second end 314 that is inserted within a mounting aperture 316 of the universal joint mount 110, and detachably secured therein by a second fastener 318, which allows the one or more holders 102 to rotate along a reciprocating path indicated by the arrow 320. The second end 314 of the intermediary coupler 304 is substantially cylindrical and is comprised of an incurvate mid-section 322 with a flat upper 324 and a flat lower 326 sections. The intermediary coupler 304 is coupled to the universal joint mount 110 by inserting the second end 314 into the mounting aperture 316, and securing it by a second fastener 318 (through aperture 333), with a tip 336 of the second fastener 318 pressed against the mid-section 322, when fully locked and assembled. The mounting aperture 316 is oriented perpendicular to the axial length 210 of the holders 102, and is comprised of a cylindrical body 330 with a second aperture 334—oriented perpendicular to the axis of the mounting aperture 316, through which the second fastener 318 is inserted.

As further indicated in FIGS. 3A to 3E, the universal joint mount 110 is comprised of a stationary jaw 334 and an adjustable jaw 336 for clamping on to the structure 300 (FIG. 3A), with the adjustable jaw 336 moving towards the stationary jaw 334 by a third threaded fastener 338 for varying a clamping tension. The third fastener 338 may include an optional retaining pin 340 coupled at an end thereof, with the third fastener 338 inserted within a set of apertures 342, 344, and 346 with apertures 342 and 344 located on the stationary jaw (or claw) 334 and aperture 346 on the adjustable jaw 336. As the third fastener 338 is rotated, the threads thereon cause the adjustable jaw 336 to move along a channel or raceway 351 towards the stationary jaw 334 to grip onto a structure 300. Accordingly, the universal joint mount 110 may be attached to a wide range of structures 300 through the adjustable clamping mechanism, and the coupled holders 102 can be moved, fixed, and positioned at any orientation, as has been illustrated and described. This allows the user to clamp on the holders to structures at any orientation, and still maintain the holders 102 at an up-right position to hold a beverage container, fishing rods, gardening tools or other items.

Figure 4B:
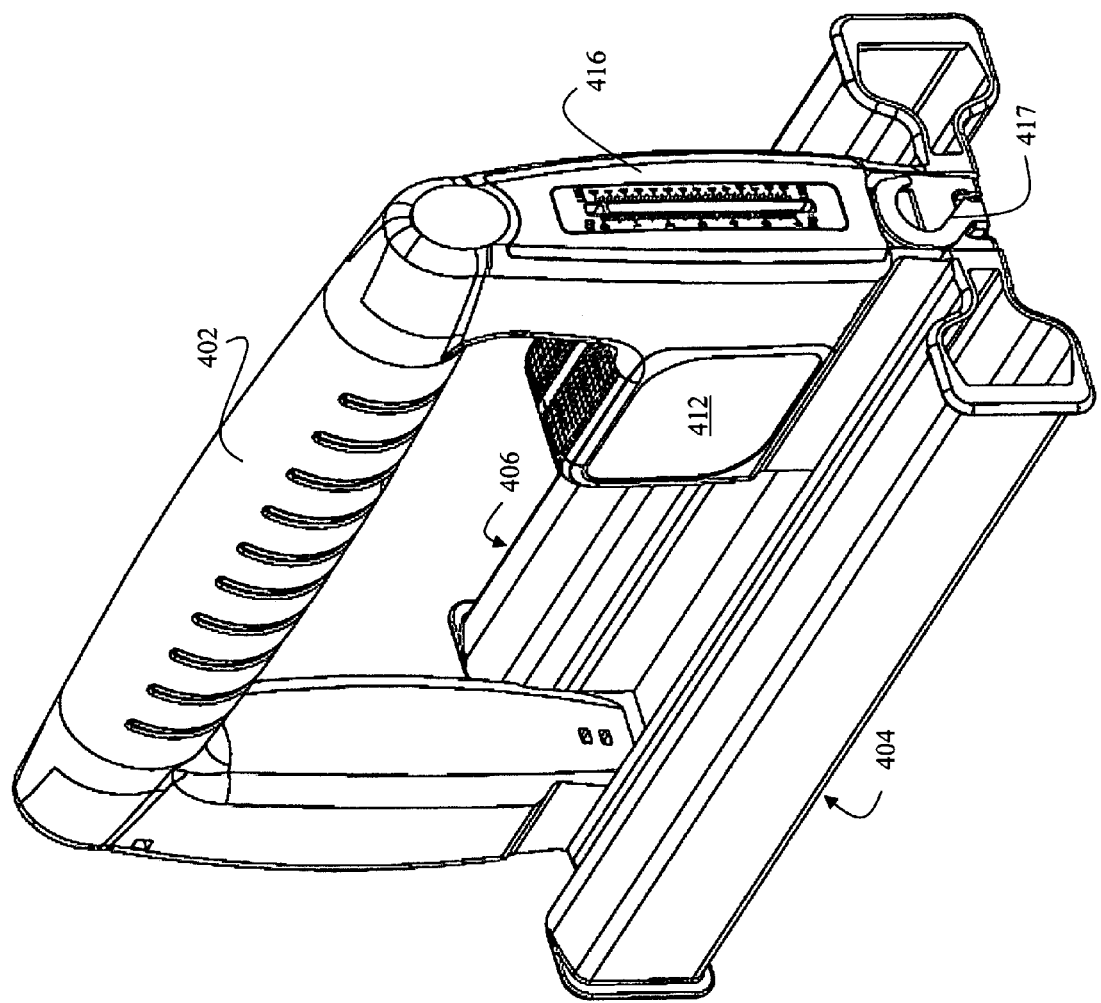
FIG. 4B is an exemplary frontal-perspective illustration of the handle illustrated in FIG. 4A.
Figure 5:
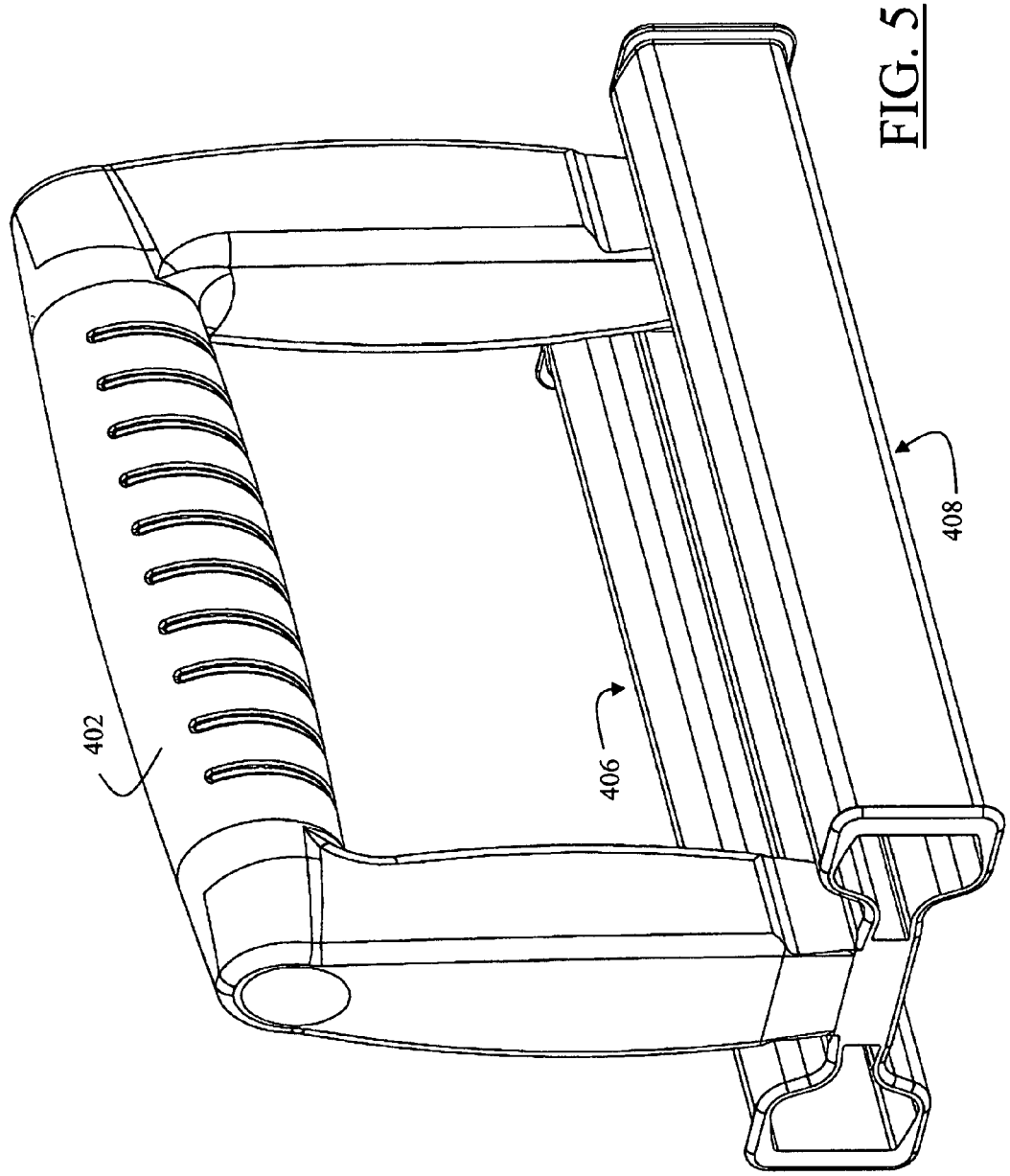
FIG. 5 is an exemplary perspective illustration of a second embodiment of a handle used with the portable apparatus of the present invention for transporting items.

FIG. 4A is an exemplary rear-perspective illustration of a handle used with the portable apparatus of the present invention for transporting items, and FIG. 4B is an exemplary frontal-perspective illustration of the handle illustrated in FIG. 4A. FIG. 5 is an exemplary perspective illustration of a second embodiment of a handle used with the portable apparatus of the present invention for transporting item.

As illustrated in FIGS. 4A to 4B, the handle 106 is comprised of an ergonomic hand grip 402, and a first and second elongated mounting bases 404 and 406 oriented longitudinally along an axial length 408 of the handle 106, with the one or more holders 102 that can detachably clamp with one of a first and second elongated mounting bases 404 and 406 by the universal joint mount 110. As further illustrated, a first embodiment of the handle 106 includes a tape measure 412, a thermometer 414 and a weight scale 416 with a scale hook 417. In general, the elongated mounting bases 404 and 406 are preferably hollow to be lightweight, with a substantially rectangular cross-section to enable the clamps 334 and 336 of the universal joint mount 110 to clamp and grasp any section of the elongated mounting bases 404 and 406 with ease (as illustrated in FIGS. 1A to 1C).

FIG. 5 is an exemplary perspective illustration of a second embodiment of a handle 500 used with the portable apparatus of the present invention for transporting item. The handle 500 includes similar corresponding or equivalent components as the handle 400 that is shown in FIGS. 4A to 4B, and described above. Therefore, for the sake of brevity, clarity, convenience, and to avoid duplication, the general description of FIG. 5 will not repeat every corresponding or equivalent component that has already been described above in relation to handle 400 that is shown in FIGS. 4A to 4B. As illustrated in FIG. 5, handle 500 is a simplified version of handle 106 in that handle 500 does not include a tape measure 412, a thermometer 414 and a weight scale 416 with the scale hook 417.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, although circular cross-sections are preferred, the holders do not have to have a circular cross-section, and hence, need not be cylindrical. The length and diameter of the holders can be varied, but the height of the first section must be of minimum height to accommodate various sizes of beverage containers. The number of holders is not limited to two, but can be one, two, three, or more, with the plurality of holders coupled with one another by bridge connectors. The one or more holders can be comprised of a single piece, substantially cylindrical configuration, with each holder of the one or more holders having varying cross-sectional diameters. That is, the diameters may vary gradually to form a cone shaped holder. Other applications for this invention are contemplated, such as its use for holding and storing gardening tools such as rakes or shovels, particularly gardening tools with poles. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A portable apparatus for transporting and holding objects, comprising:
   a holder to retain containers and items, including transporting of items with elongated configurations;
   the holder is comprised of a single piece, integrally molded, substantially cylindrical configuration, including:
   a first section that is comprised of:
   a first opening transverse an axial length of the holder, and having a first cross-sectional length;
   a first lip that includes a first rim that defines a first perimeter of the first opening, with the first lip tilted and diverged away from a first center of the first opening at an angle for easy insertion and removal of containers and items of elongated configuration;
   a first body having substantially cylindrical hollow configuration with a first height and a second-cross-sectional length smaller than the first cross-sectional length;
   the first body including a substantially "U" shaped second opening with a length oriented longitudinally parallel along the axial length of the holder, with the second opening having length less than the first height for securing items having protrusions that are longer and extend outside the second cross-sectional length;
   a second rim that defines a second perimeter for the second opening, with the second rim and the first rim defining a continuous first upper edge opening of the first section;
   a set of narrow slits oriented longitudinally parallel along an axial length of the holder for securing the items with elongated configurations therein the holder by use of a strap inserted through the narrow slits and wrapped around the items;
   a first bottom section having a third opening transverse the axial length of the holder and parallel the first opening, and having a third cross-sectional length smaller than that of the second cross-sectional length;
   a second section that is comprised of:
   a second body having substantially cylindrical configuration that is hollow with a second height, including the third opening at proximal end and a fourth opening at a distal end, with second body and the fourth opening having the third-cross-sectional length; and
   one or more holes at the distal end of the second body for storage of accessories that are inserted within the one or more holes; and
   a universal joint mount coupled with the holder to detachably secure the holder adjustably onto a structure; and
   a handle detachably coupled with the holder for transporting the holder.

2. The portable apparatus for transporting and holding objects as set forth in claim 1, wherein:
   the second-cross-sectional length is approximately 2 inches to about 4 inches and the third-cross-sectional length is approximately 1 inches to about 3 inches.

3. The portable apparatus for transporting and holding objects as set forth in claim 2, wherein:
   the holder is comprised of a plurality of holders that are coupled with one another by a bridge connector as a single piece, integral unit with each holder of the plurality of holders having a substantially cylindrical configuration.

4. The portable apparatus for transporting and holding objects s as set forth in claim 3, wherein:
   a first holder and a second holder of the plurality of holders are comprised of a single piece, substantially cylindrical configuration, with the first and second holders having varying cross-sectional lengths.

5. The portable apparatus for transporting and holding objects as set forth in claim 1, wherein:
   the holder is configured for a storage of a beverage container and an elongated item.

6. The portable apparatus for transporting and holding objects as set forth in claim 3, wherein:
   the holder is further comprised of a connector mechanism that mates with the universal joint mount through an adjustable intermediary coupler.

7. The portable apparatus for transporting and holding objects as set forth in claim 6, wherein:
   the holder, the bridge connector, and the connector mechanism are integrally coupled, forming a single piece unit.

8. The portable apparatus for transporting and holding objects as set forth in claim 6, wherein:
   a first end of the intermediary coupler is connected with the connector mechanism, and a second end of the intermediary coupler is inserted within a mounting aperture of the universal joint mount, and detachably secured therein by a second fastener, which allows the holder to rotate in any direction and position at any orientation.

9. The portable apparatus for transporting and holding objects as set forth in claim 8, wherein:
   the universal joint mount is comprised of a stationary jaw and an adjustable jaw for clamping on to a structure, with the adjustable jaw moved towards the stationary jaw by a third fastener for varying a clamping tension.

10. The portable apparatus for transporting and holding objects as set forth in claim 1, wherein:
    the handle is comprised of a hand grip section, and a first and second elongated mounting bases oriented longitudinally along an axial length of the handle, with the holder detachably clamped with one of a first and second elongated mounting bases by the universal joint mount for transporting objects.

11. The portable apparatus for transporting and holding objects as set forth in claim 10, wherein:
    the handle includes a tape measure, a thermometer, a weight scale, and a scale hook.

* * * * *